United States Patent [19]
Tuschner

[11] 3,990,913
[45] Nov. 9, 1976

[54] PHOSPHORIC ACID HEAT TRANSFER MATERIAL

[75] Inventor: Jerome G. Tuschner, Enfield, Conn.

[73] Assignee: United Technologies Corporation, Hartford, Conn.

[22] Filed: July 21, 1975

[21] Appl. No.: 597,615

[52] U.S. Cl. .............................................. 429/26
[51] Int. Cl.² ...................... H01M 8/00; H01M 8/04
[58] Field of Search ....................... 252/29, 30, 71; 136/86 R

[56] References Cited
UNITED STATES PATENTS 3,202,546  8/1965  Rightmire et al. ................. 136/86 R
3,440,102  4/1969  Holt ................................... 136/86 R Primary Examiner—John H. Mack
Assistant Examiner—H. A. Feeley
Attorney, Agent, or Firm—Stephen E. Revis

[57] ABSTRACT

A grease-like material, suitable for use with phosphoric acid fuel cells, is comprised of a phosphoric acid base with a filler which is stable in phosphoric acid at the temperatures to which the grease will be subjected and is preferably thermally conductive. Three fillers which are particularly suited for fuel cell applications are carbon, graphite, and silicon carbide.

7 Claims, 3 Drawing Figures

PHOSPHORIC ACID HEAT TRANSFER MATERIAL

BACKGROUND OF THE INVENTION

1. Field of the Invention

This invention relates to a thermally conductive grease-like material.

2. Description of the Prior Art

Thermally conductive greases are well known in the art and are useful for sealing between two bodies wherein it is desirable to transfer heat between the two bodies. These greases may also be used to improve thermal conductivity between two contacting surfaces wherein a layer of grease between the surfaces fills in any air spaces. For low temperature applications these greases typically include hydrocarbon or parafin type oils filled, for example, with aluminum oxide, aluminum hydrate, silica, carbon or graphite. For temperatures greater than about 250° F silicon oil base greases are often used in place of the hydrocarbon parafin base greases.

None of these prior art thermally conductive greases are entirely suitable in the environment of a phosphoric acid fuel cell or stack of fuel cells wherein temperatures may exceed 250° F. Greases of parafin or silicon oils typically are volatilized, oxidized or react with $H_3PO_4$ at cell operation conditions. The silicon oil base greases tend to volatilize at the higher temperatures, with a resultant loss in thermal conductivity due to void formation in the grease. As the grease dries, it cracks, resulting in a loss of surface contact which defeats the purpose of the grease, namely, to provide high thermal conductivity between the adjacent components.

SUMMARY OF THE INVENTION

One object of the present invention is a novel grease suitable for high temperature applications.

Another object of the present invention is a thermally conductive grease which is stable in a phosphoric acid environment over an extended period of time.

Accordingly, a grease in accordance with the present invention comprises a phosphoric acid base with a filler chemically stable in phosphoric acid. Preferably the constituents are chosen to give the grease good thermal conductivity.

Greases according to the present invention are particularly suitable for use in phosphoric acid fuel cell stacks wherein the grease is exposed to phosphoric acid and where good thermal conductivity is desired. Since phosphoric acid is the base for the grease, it does not volatilize at phosphoric acid fuel cell operating temperatures as do all the oil base greases including silicon oil base greases of the prior art.

With the grease of the present invention, as with the greases of the prior art, the filler material provides the good thermal conductivity. However, the filler cannot be used by itself alone, as a powder or solid block, it cannot be readily applied between contacting surfaces. Also, it would be replete with air pockets thereby significantly reducing the overall thermal conductivity of the material. The base material (phosphoric acid) fills in the pockets between the particles and gives the filler the consistency of a grease in order that it may be applied as a film or layer between the working surfaces. The filler particle size and particle porosity is generally chosen so as to give the grease the viscosity desired for the particular application, although particle size and porosity also affect thermal conductivity.

It is preferred that the cncentration of the phosphoric acid used in the grease is the same as that used in the fuel cell since the water content of the phosphoric acid will come to equilibrium if there is a difference in the concentration. Typically the concentration of phosphoric acid in fuel cells is about 96% by weight, the balance being water. A preferred grease for use in this environment comprises 30%-70% by weight 96% concentration phosphoric acid with the balance being filler. The filler is preferably either graphite, carbon, or silicon carbide (or combination thereof), all of which are virtually inert in phosphoric acid up to at least 400° F. Of these three fillers graphite has the highest thermal conductivity and is therefore preferred. However, good thermal conductivity can be obtained with any of these fillers. Other fillers may be suitable for other applications.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

An exemplary grease of the present invention comprises a phosphoric acid base with a graphite filler. Depending upon the choice of graphite particle size and the amount of filler relative to the amount of phosphoric acid, a thermal conductivity of from 0.5 to 4.0 Btu/ft·hr·° F can be obtained. Larger graphite particles can produce a grease having greater thermal conductivity and requiring less acid per unit weight of filler to fill the void spaces between the particles; however, larger particles cannot be compressed into as thin a film as smaller particles because they do not move with the liquid media; but this may or may not be of concern depending upon the particular application for the grease. Porosity of the graphite particles, which varies depending upon the source and type of graphite purchased, will also affect the consistency of the grease.

By properly choosing the ratio of phosphoric acid to graphite and also the size and porosity of the graphite particles, a person having ordinary skill in the art can tailor the grease to have a thermal conductivity within the aforementioned range and virtually any desirable consistency. Note, however, that for certain consistencies it may not be possible to obtain all thermal conductivities within the stated range. Thus, some compromises may have to be made in formulating a grease having the best possible combination of properties for a particular application.

Any concentration of phosphoric acid can be used as the base as long as the thermal stability of the acid is adequate at the particular operating temperature of the grease. In fuel cells wherein the phosphoric acid electrolyte concentration is 96% it is preferable to use a 96% concentration of phosphoric acid when making the grease. The reason for this may best be understood by considering the following situation: Assume that the thermal grease is made with a 65% phosphoric acid concentrate. In that instance, when put into a stack which has a 96% phosphoric acid concentration, the phosphoric acid in the grease goes to equilibrium during fuel cell operation, and the water in the grease is reduced from 35% to 4%. This leaves considerable air space in the grease reducing its thermal conductivity. Note, however, that small differences in concentration may be tolerable.

Thermally conductive greases having various consistencies and suitable for a wide range of applications can also be made using a filler of silicon carbide or carbon with a phosphoric acid base. Maximum obtainable thermal conductivity will be somewhat less than with a graphite filler simply due to the inherently lower thermal conductivity of silicon carbide and carbon as compared to graphite. It has been estimated that greases using silicon carbide can be made having a thermal conductivity of from about 0.5 to 1.0 Btu/ft·hr·° F. Greases using carbon can be made having a thermal conductivity of from about 0.5 to 1.5 Btu/ft·hr·° F.

Figure 1:
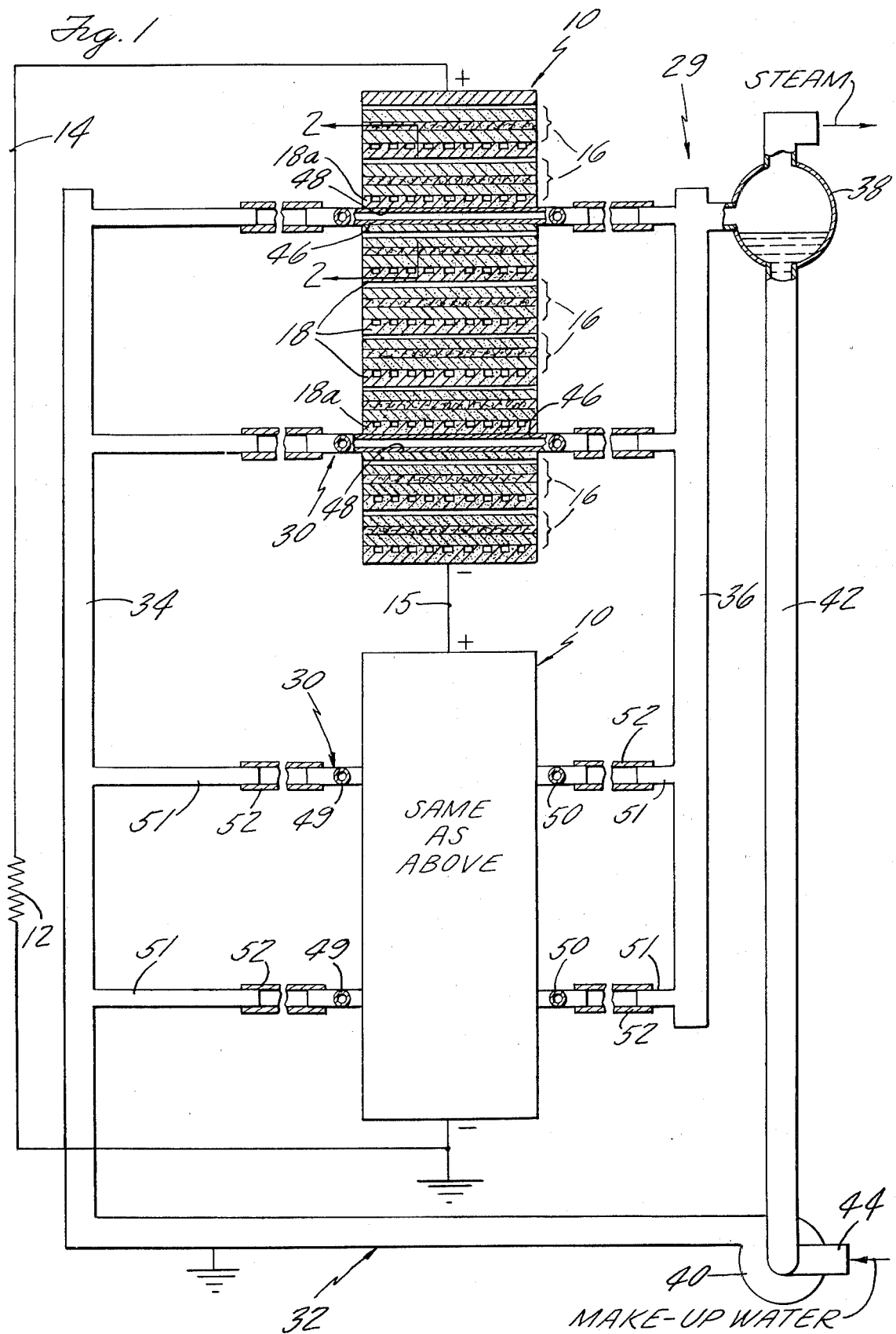
FIG. 1 is a schematic sectional view of a fuel cell stack and cooling system therefor which incorporates the grease of the present invention.

Referring, now, to FIG. 1, fuel cell stacks 10 which incorporate the grease of the present invention are shown. The stacks are connected electrically in series to each other and across a load 12 such as by the electrical connections 14, 15. Each stack 10 comprises a plurality of cells 16. Separator plates 18, 18a separate each pair of adjacent cells and are made of graphite. The plates 18, 18a are electrically conductive and serve to electrically connect the individual cells 16 in series.

Figure 2:
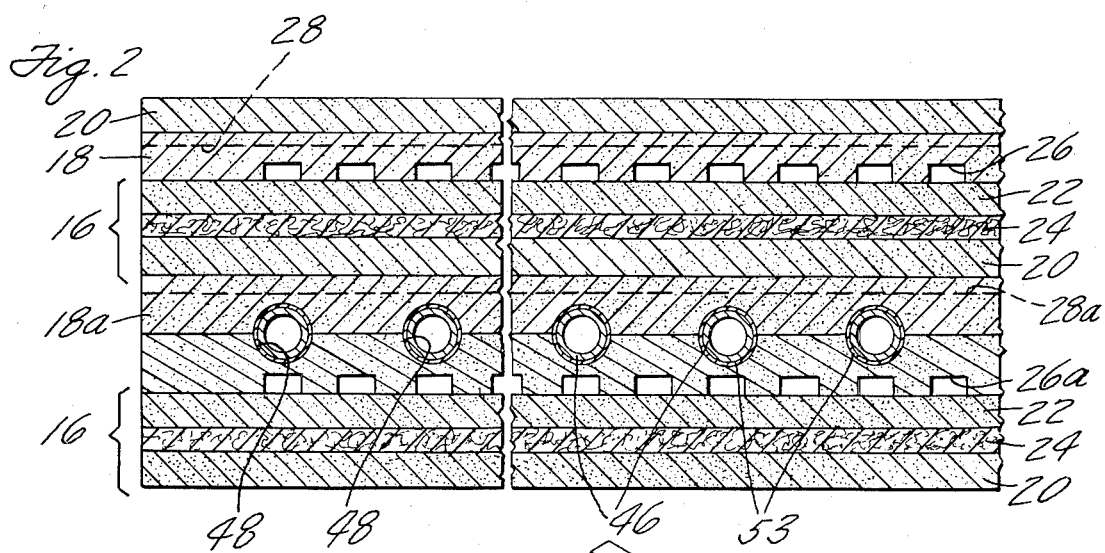
FIG. 2 is an enlarged sectional view taken along the line 2—2 of FIG. 1.

The cells 16 and the plates 18, 18a are best shown in FIG. 2. Each cell 16 comprises an anode electrode 20 spaced apart from a cathode electrode 22 by an electrolyte retaining matrix 24. The electrolyte is 96% concentration (by weight) phosphoric acid. Channels 26, 26a in the separator plates 18, 18a respectively, carry an oxidant into communication with the cathode electrode 22. Channels 28, 28a in the separator plates 18, 18a, respectively, carry a fuel into communication with the anode electrodes 20. The oxidant carrying channels are perpendicular to the fuel carrying channels, each extending from one side of the plate to the other and being fed by manifolds which are not shown. In this embodiment the electrodes are of the well known gas diffusion type suitable for use with air as the oxidant and hydrogen containing gas as the fuel.

Returning again to FIG. 1, a cooling system 29, including coolers 30, is designed to carry a coolant into heat transfer relationship with the cells 16. In this preferred embodiment the coolant is water. The cooling system 29 also includes a circulation system 32. The circulation system 32 includes a coolant supply line 34 for delivering water into the coolers 30; a coolant collection line 36 for collecting coolant in the form of liquid water and steam exiting from the coolers 30; a steam separator 38 for separating steam from liquid water; a pump 40 for circulating the water through the cooling system; a conduit 42 for returning liquid water from the separator 38 to the pump 40 for recirculation; and, a conduit 44 for adding make up water to the system. The steam from the separator 38 may be used elsewhere in the power plant or it may simply be condensed and returned to the circulation system via the conduit 44.

Figure 3:
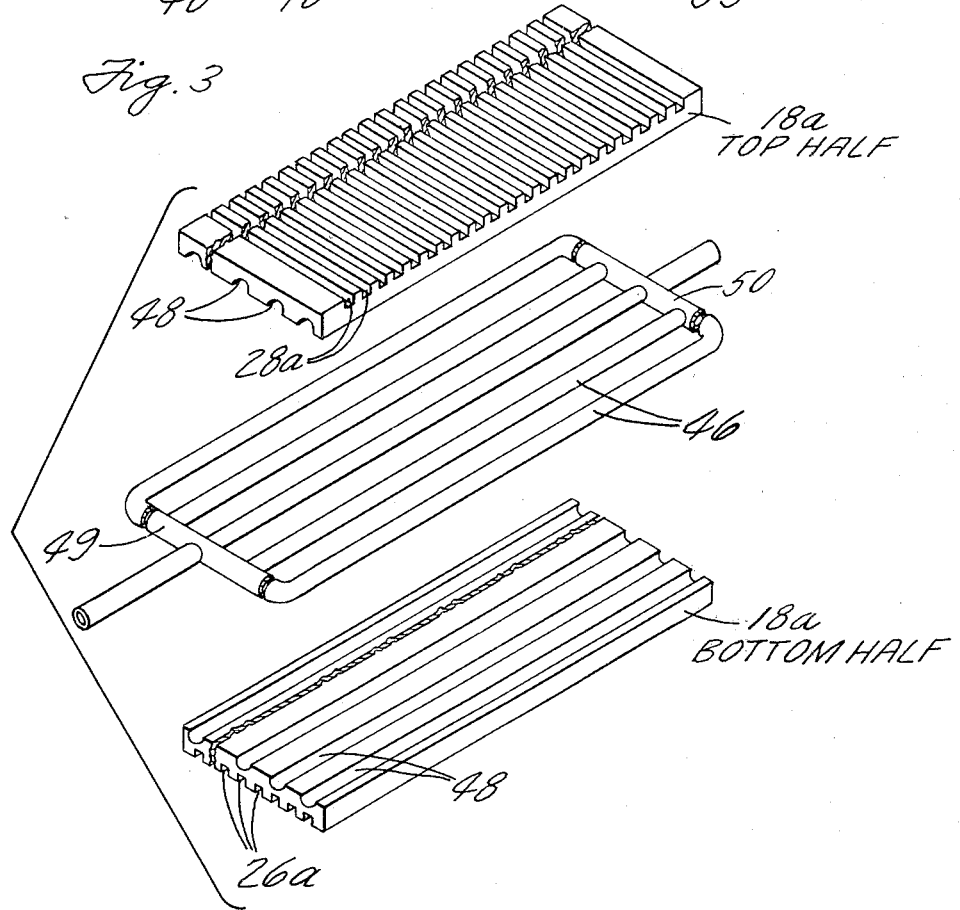
FIG. 3 is an illustrative, exploded, perspective view of a separator plate and cooler tubes of a fuel cell in one of the stacks of FIG. 1.

Each cooler 30 includes a plurality of cooler tubes 46 which pass through the separator plates 18a. The tubes 46 and plates 18a are clearly shown in FIGS. 2 and 3. The cooler tubes 46 are disposed in passageways 48 formed in the plates 18a and are connected by headers 49, 50. In this embodiment the tubes 46 are copper coated with polytetrafluoroethylene on their external surface to protect the copper from the phosphoric acid environment of the cell and to prevent electric current from flowing into the tubes and coolant and perhaps short circuiting or otherwise damaging the stack. As a further precaution against short circuiting, should there be a flaw in the protective coating, the conduits 51 connecting the coolers 30 to the circulation system 29 are provided with dielectric hose portions 52.

The best overall heat transfer efficiency for the cooling system would result if there were perfect contact between the tubes 46 and the plates 18a. However, due to manufacturing tolerances it is difficult to avoid gaps 53 between the tubes 46 and the walls of the passageways 48. Therefore, the gaps 53 are filled with the thermally conductive grease of the present invention by applying a very thin layer thereof, preferably less than 10 mils, to the walls of the passageway 48. A thin layer is more conductive than a thick layer and permits more direct contact between the tubes 46 and passageways 48.

As hereinabove mentioned the separator plates 18, 18a are graphite. This graphite does contain micro porosity. Because they are porous and in contact with the electrodes of the cells these pores become filled with phosphoric acid electrolyte. Therefore, it is mandatory, in this application, that the grease be stable in phosphoric acid at cell operating temperatures which may be in excess of 350° F. Furthermore, because this grease is disposed between the separator plates and the cooler tubes it should have a high thermal conductivity which is preferably at least 0.5 Btu/ft·hr·° F, since a lesser thermal conductivity may increase the coolant flow rate requirements to undesirable levels. Increased flow rates are undesirable since they require either more or larger tubes 46, a larger pump 40, and larger supply and collection lines 34, 36.

In general, a grease suitable for use in a phosphoric acid fuel cell as above described and which utilizes a 96% concentration phosphoric acid electrolyte, may comprise anywhere from 30% to 70% by weight of 96% concentration phosphoric acid with the balance being either graphite, silicon carbide, or carbon.

EXAMPLE I

A thermal grease according to the present invention and which has been found suitable for use in the above described fuel cell stack comprised 65% by weight of 96% concentration phosphoric acid, 30% by weight of Asbury Corporation 7101 graphite, and 5% by weight Vulcan XC-72 graphite from Cabot Corporation. The 7101 graphite comprises various particle sizes of which 89% are smaller than 325 mesh, and the XC-72 graphite particles are all less than about 10 microns. The grease may be readily compounded by adding all the raw materials to a sheer type mixer, such as a Hobart mixer or Baker Perkins sigma blade mixer. By mixing for one half to five minutes a homogeneous blend is obtained which is ready to use.

With the foregoing composition a film of 5–7 thousandths inch was readily applied to the surface of separator plate passageways similar to the passageways 48 of FIG. 2, and had a thermal conductivity of about 1.5 Btu/ft·hr·° F.

EXAMPLE II

Another grease according to the present invention which was found suitable for use in the fuel cell stack described above had a formulation of 55% phosphoric acid (96% concentration) and 45% graphite. The graphite particles included 89% which were smaller than 325 mesh (i.e., Asbury's 7101 graphite), but included no fine particles (i.e., less than 10 microns) as in Example I. The thermal conductivity of this grease was 2 Btu/ft·hu·° F, however, its consistency made handling and applying of this grease less than desirable.

EXAMPLE III

Another grease according to the present invention and suitable for fuel cell use has a formulation of about 60% phosphoric acid (96% concentration) and 40% Thermax carbon black from R. T. Vanderbilt Company. The grease had a conductivity of about 0.5 Btu/ft·hr·° F.

EXAMPLE IV

A grease was made using 45% phosphoric acid (96% concentration) and 55% silicon carbide. The silicon carbide particles had an average size of 600 mesh. conductivity of this grease was about 1.1 Btu/ft·hr·° F.

Although good thermal conductivity is obtainable using the ingredients mentioned and over the wide ranges hereinabove set forth, it is preferable for most applications, from the standpoint of grease consistency, that the filler include at least a small amount of fine particles on the order of 10 microns or less in diameter (see Example I, above). It is felt that a suitable consistency will be obtained if between 2% and 10% of the total weight of the grease is composed of fine particles.

As used hereinafter in the claims the phrase "phosphoric acid" is intended to encompass within its meaning 100% phosphoric acid and a phosphoric acid/water concentrate.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a fuel cell stack comprising a plurality of cells, said cells including a phosphoric acid electrolyte, said stack also including separator plate means disposed between each pair of adjacent cells, at least one of said separator plate means including coolant passages formed therein parallel to the plane of said plate means, the improvement to said stack comprising:
   cooler tubes disposed in said passageways for carrying a coolant between said cells, said tubes including outwardly facing surfaces, said passageways including surfaces adjacent said tube surfaces and including gaps therebetween; and
   a heat transfer material disposed between said outwardly facing tube surfaces and said adjacent passageway surfaces filling in said gaps, said material consisting of phosphoric acid and a filler selected from the group consisting of silicon carbide, carbon, and graphite.

2. The improvement according to claim 1 wherein said material has a thermal conductivity of at least 0.5 Btu/ft·hr·° F.

3. The improvement according to claim 2 wherein said filler is graphite.

4. The improvement according to claim 2 wherein said filler is silicon carbide.

5. The improvement according to claim 2 wherein said filler is carbon.

6. The improvement according to claim 2 wherein said material includes 2%-10% by weight filler particles having a size no greater than about 10 microns.

7. The improvement according to claim 2, wherein said separator plate means includes a first surface facing one of said pair of adjacent cells and a second surface facing the other of said pair of adjacent cells, and said passageways are disposed between said surfaces, said plate means being porous to the electrolyte and said electrolyte being in contact with said heat transfer material through said porous plate means.

* * * * *